United States Patent
Uyama et al.

(10) Patent No.: US 9,021,381 B2
(45) Date of Patent: Apr. 28, 2015

(54) DISPLAY DEVICE, CONTROLLER, METHOD AND COMPUTER READABLE MEDIUM

(75) Inventors: Masashi Uyama, Kawasaki (JP); Naoki Sashida, Kawasaki (JP); Kazushi Ishigaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 817 days.

(21) Appl. No.: 13/044,713

(22) Filed: Mar. 10, 2011

(65) Prior Publication Data

US 2011/0234606 A1 Sep. 29, 2011

(30) Foreign Application Priority Data

Mar. 25, 2010 (JP) ................................. 2010-070406

(51) Int. Cl.
*G06F 3/048* (2013.01)
*G06F 17/30* (2006.01)
*G06F 3/0483* (2013.01)

(52) U.S. Cl.
CPC ........ *G06F 17/30058* (2013.01); *G06F 3/0483* (2013.01)

(58) Field of Classification Search
CPC ............................ G06F 3/0483; G06F 15/0291
USPC ..................... 715/776, 802; 700/83
See application file for complete search history.

(56) References Cited

U.S. PATENT DOCUMENTS

| 7,191,399 B2 | 3/2007 | Ohtani et al. | |
| 8,151,204 B2* | 4/2012 | Lusen et al. | 715/769 |
| 2003/0100965 A1* | 5/2003 | Sitrick et al. | 700/83 |
| 2003/0117425 A1* | 6/2003 | O'Leary et al. | 345/700 |
| 2004/0139400 A1* | 7/2004 | Allam et al. | 715/526 |
| 2005/0005246 A1* | 1/2005 | Card et al. | 715/776 |
| 2008/0301578 A1* | 12/2008 | Olson | 715/802 |

FOREIGN PATENT DOCUMENTS

| JP | 2003-280622 A | 10/2003 |
| JP | 2004-139399 A | 5/2004 |
| JP | 2005-070831 A | 3/2005 |
| JP | 2006-318069 A | 11/2006 |
| WO | WO-2007/030682 | 3/2007 |

OTHER PUBLICATIONS

Chen, Nicholas et al., "Navigation Techniques for Dual-Display E-Book Readers", ACM CHI 2008, Apr. 5, 2008, pp. 1779-1788.
Japanese Office Action mailed Oct. 8, 2013 for corresponding Japanese Application No. 2010-070406, with Partial English-language Translation.

* cited by examiner

*Primary Examiner* — Haoshian Shih
(74) *Attorney, Agent, or Firm* — Oblon, McClelland, Maier & Neustadt, L.L.P.

(57) ABSTRACT

A display controller device includes: a display data storage unit configured to store therein a plurality of display images; an operation unit configured to accept a page change operation for changing the display images; a page turning processing unit configured to update the display images; a working unit configured to update the display data storage unit by changing a display image to be displayed on a second display area to a second display image produced on the basis of a first display image updated by the page turning processing unit and stored in the display data storage unit; and a display instruction unit configured to refer to the display data storage unit so as to display individually the display images individually stored in relation to the plural display areas on the respective plural display areas of the display unit.

21 Claims, 20 Drawing Sheets

FIG. 6A

| OUTPUT WINDOW NUMBER | PROCESSING FUNCTION NAME | INPUT ORIGINAL DATA NUMBER |
|---|---|---|
| 1 | NA | NA |
| 2 | NA | NA |
| 3 | NA | NA |
| 4 | NA | NA |

FIG. 6B

| OUTPUT WINDOW NUMBER | PROCESSING FUNCTION NAME | INPUT ORIGINAL DATA NUMBER |
|---|---|---|
| 1 | NA | NA |
| 2 | "square" | 1 |
| 3 | NA | NA |
| 4 | NA | NA |

FIG. 11

| EVENT NUMBER | EVENT NAME | PROCESS TYPE | PROCESSING FUNCTION NAME |
|---|---|---|---|
| 1 | LEFT FLICK | NEXT PAGE TURNING | "left" |
| 2 | RIGHT FLICK | PREVIOUS PAGE TURNING | "right" |
| 3 | SQUARE OPERATION | SQUARE OPERATION | "square" |
| 4 | SQUARE ROOT OPERATION | SQUARE ROOT OPERATION | "sqrt" |

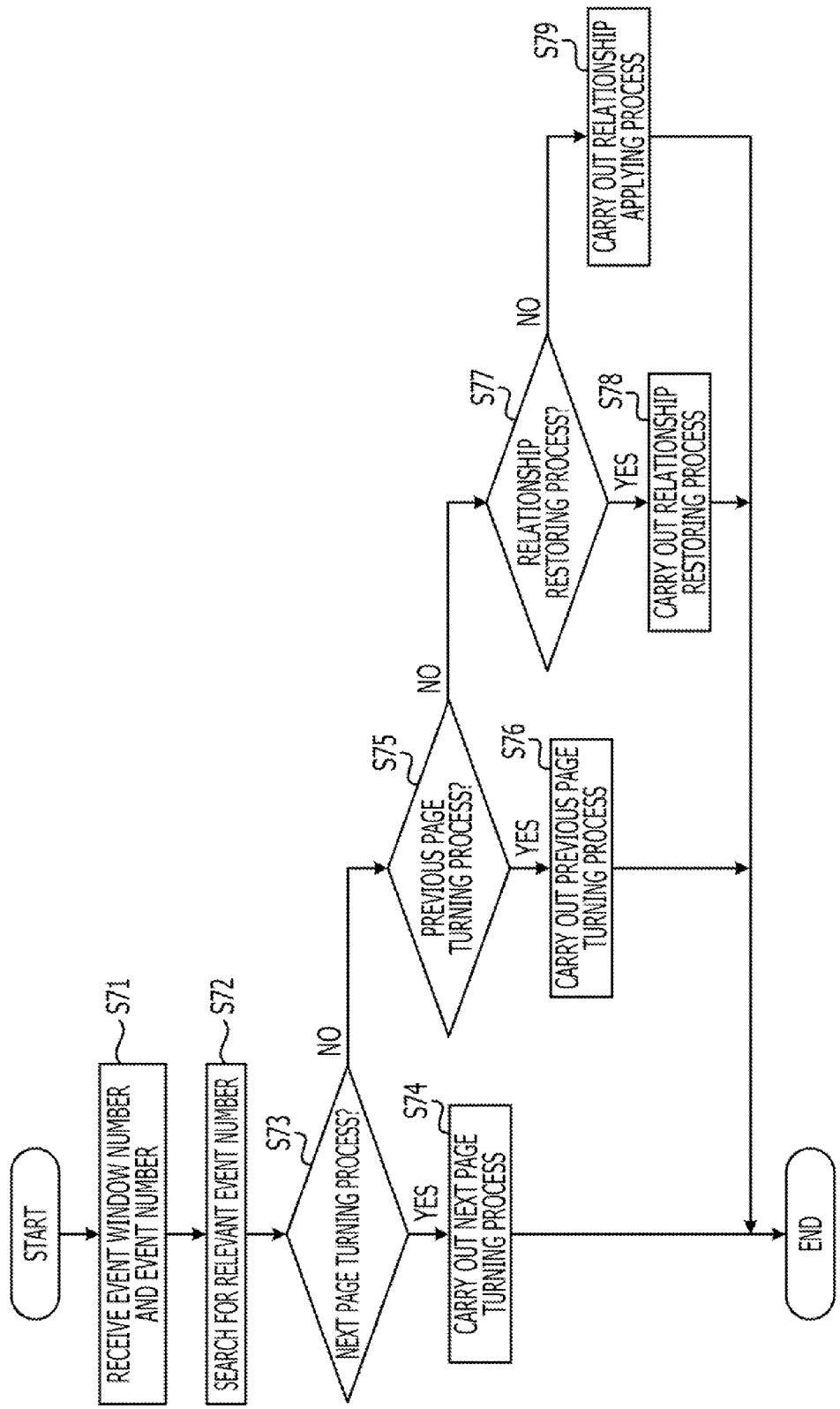

RIGHT FLICK (PREVIOUS PAGE TURNING PROCESS)

RELATIONSHIP DEFINITION TABLE 50a

| OUTPUT WINDOW NUMBER | PROCESSING FUNCTION NAME | INPUT ORIGINAL DATA NUMBER |
|---|---|---|
| 1 | NA | NA |
| 2 | NA | NA |
| 3 | "f" | 2 |
| 4 | NA | NA |

AFTER RIGHT FLICK (AFTER PREVIOUS PAGE TURNING PROCESS)

RELATIONSHIP DEFINITION TABLE 50a

| OUTPUT WINDOW NUMBER | PROCESSING FUNCTION NAME | INPUT ORIGINAL DATA NUMBER |
|---|---|---|
| 1 | NA | NA |
| 2 | NA | NA |
| 3 | "f" | 2 |
| 4 | NA | NA |

FIG. 18

| EVENT NUMBER | EVENT NAME | PROCESS TYPE | PROCESSING FUNCTION NAME | SELF DISPLAY MODE |
|---|---|---|---|---|
| 1 | LEFT FLICK | NEXT PAGE TURNING | "left" | NA |
| 2 | RIGHT FLICK | PREVIOUS PAGE TURNING | "right" | NA |
| 3 | SQUARE OPERATION | SQUARE OPERATION | "square" | F |
| 4 | SQUARE ROOT OPERATION | SQUARE ROOT OPERATION | "sqrt" | F |
| 5 | CLIP | CLIP | "clip" | T |

30b

DISPLAY DEVICE, CONTROLLER, METHOD AND COMPUTER READABLE MEDIUM

CROSS-REFERENCE TO RELATED APPLICATIONS

This application is based upon and claims the benefit of priority of the prior Japanese Patent Application No. 2010-70406, filed on Mar. 25, 2010, the entire contents of which are incorporated herein by reference.

FIELD

Various embodiments described herein relate to a display device, controller, method and a computer readable medium.

BACKGROUND

There exists data having a sequential structure including data formed by a plurality of pages given consecutive numbers such as a book, and data formed by a plurality of pages given consecutive dates such as a scheduler. Such data having a sequential structure is implemented on a computer by the use of a queue or a linear list. It is more convenient to display consecutive pages of such data using as many windows on a display than to display them by using a single window as the plural pages can be referred to at once.

Further, a page turning operation for updating a plurality of pages displayed on the windows can be introduced so that the pages can be read ahead quickly. The page turning operation can be implemented by the use of a page turning button, a trackball, a flick operation, etc.

A system which has a plurality of windows and implements a page turning operation for updating the plural windows at the same time is disclosed, e.g., in a following document.

Japanese Laid-Open Patent Publication No. 2004-139399 discusses providing a displaying means having two display screens, for displaying an image of image data covering two facing pages on the display screens and for displaying images of following pages covering two facing pages on the display screens in series upon a page turning button being pushed.

Japanese Laid-Open Patent Publication No. WO2007/030682 discusses displaying two separate pages of an electronic document on a graphical user interface, and replacing a first pair of displayed pages of the electronic document with a second pair of displayed pages of the electronic document upon being selected by a page turning control.

Navigation Techniques for Dual-Display E-Book Readers, ACM CHI 2008, pp. 1779-1788 discusses an example for which not only two consecutive pages of data having a sequential structure are displayed on two screens, but a book-marked page is displayed in one window and any page being displayed another window is compared with the bookmarked page.

SUMMARY

According to an aspect of the invention, a display controller device includes: a display data storage unit configured to store therein a plurality of display images; an operation unit configured to accept a page change operation for changing the display images; a page turning processing unit configured to update the display images; a working unit configured to update the display data storage unit by changing a display image to be displayed on a second display area to a second display image produced on the basis of a first display image updated by the page turning processing unit and stored in the display data storage unit; and a display instruction unit configured to refer to the display data storage unit so as to display the display images individually stored in relation to the plural display areas on the respective plural display areas of the display unit.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams illustrating an example of a relationship definition table;

FIG. 11 is a diagram illustrating an example of an event definition table;

FIG. 12 is a flowchart illustrating a procedure of a process carried out by an event processing unit;

FIG. 18 is a diagram illustrating an example of an event definition table to be used by an event processing unit of a fourth embodiment;

DESCRIPTION OF EMBODIMENTS

Figure 1A:
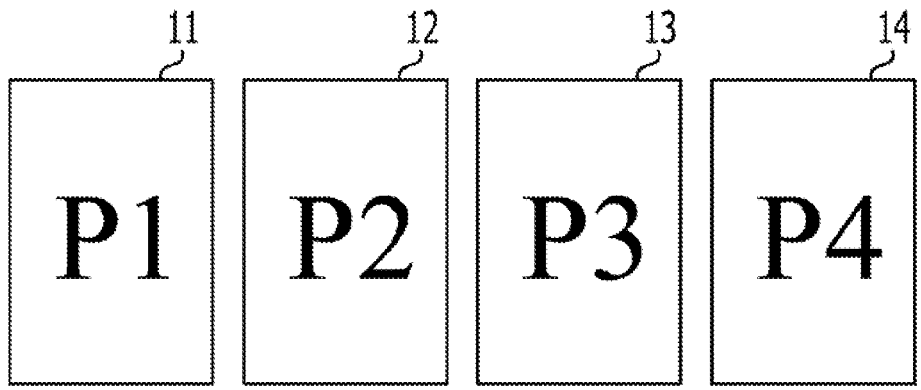
FIGS. 1A-1C are diagrams illustrating a display method on a display device of an embodiment.

Reference will now be made in detail to the embodiments, examples of which are illustrated in the accompanying drawings, wherein like reference numerals refer to the like elements throughout. The embodiments are described below to explain the present invention by referring to the figures. In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element between the two elements, or one or more intervening elements may also be present.

According to the related art described above, in a case where a certain page of data having a sequential structure is displayed on a first screen and a result of processing is displayed on a second screen for any process, it cannot be achieved to display a next page of the sequential data on the first screen and to display a result of processing for the next page on the second screen.

The invention will be specifically explained on the basis of drawings for illustrating embodiments of the invention as follows.

First Embodiment

Figure 1B:
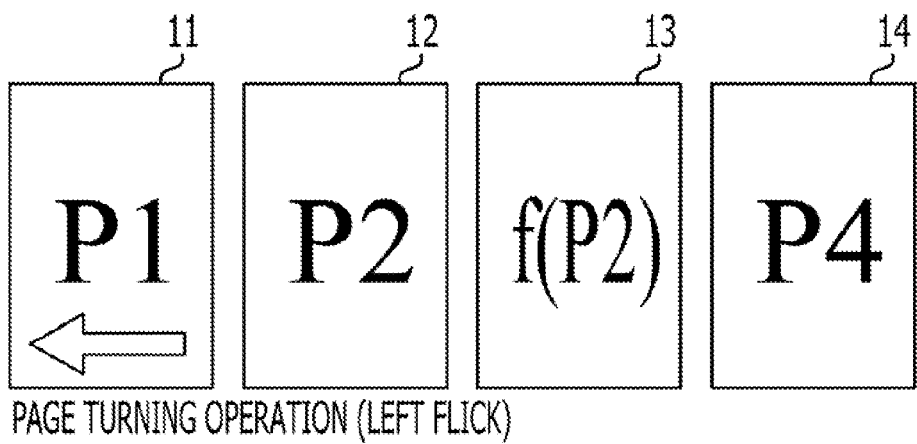
Figure 1C:
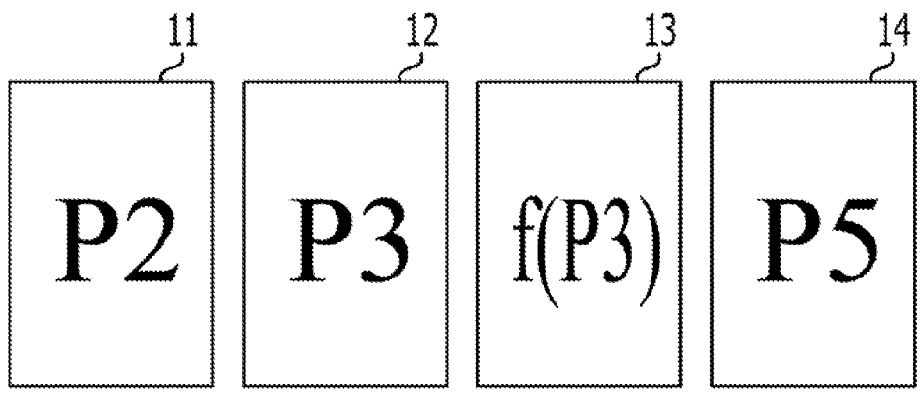

FIGS. 1A-1C are diagrams illustrating a display method on a display device of the embodiment. A display device 1 of the embodiment is a display device having four display areas (windows 11, 12, 13 and 14) arranged parallel in a width direction. In order to display a document formed by a plurality of pages on the respective windows 11-14 which the display device 1 has, it is enabled to display images P1, P2, P3 and P4 of consecutive four pages such as a first page, a second page, a third page and a fourth page in the windows in series from the window 11 on the left end (FIG. 1A).

Further, according to the embodiment, some user-chosen process is applied to the images P1-P4 being displayed on the respective windows 11-14, so that an image of a result of processing can be displayed in association with the original image. As illustrated in FIG. 1B, e.g., an image f(P2) produced by a processing function f applied to the image P2 being displayed on the window 12 is displayed on the window 13 on the right next to the window 12.

According to the first embodiment, when the image f(P2) of the result of processing is displayed on the window 13, the image P3 that used to be displayed on the window 13 is not displayed. It appears to the user that the image P3 is overlaid with the image f(P2). Such a display mode is called an overlay mode.

Any process can be set as what can be applied to the images P1-P4. What can be enumerated are, e.g., a process for producing a page for providing data with a comment and for viewing the comment, a color conversion process for image data, an outline extracting process for image data, a translation process for document data, and a scoring process for reply data to some question included in the image data. Hereinafter, these processes are represented by the processing function f for convenience, and an image of a result of the processing function f applied, e.g., to the image P1 is represented by f(P1).

Further, according to the embodiment, a page changing operation for changing a displayed page is accepted. An operation for turning pages one by one by the use of a flick operation, etc. can be enumerated, e.g., as such a page changing operation. Further, an operation for selecting a page can be accepted on one of the windows 11-14.

FIG. 1C illustrates an example for which the displayed page, e.g., on the window 11 is changed from a first page to a second page by the use of the page turning operation. If the displayed page on the window 11 is changed from the first page to the second page, the image P2 corresponding to the second page is displayed on the window 11. Further, the pages are changed by the page turning operation, so that images P3 and P5 corresponding to the third and fifth pages are displayed on the windows 12 and 14, respectively. Meanwhile, as the processing function f has been set to be applied on the window 13, an image f(P3) of a result of the processing function f applied to the image P3 is displayed on the window 13.

As described above, if an image after the processing function f is applied is set to be displayed and even if a page changing operation is accepted, images are displayed page by page on the windows 11-14 while a relationship between an image Px of an object of the application and an image f(Px) after the application is being maintained.

Figure 2:
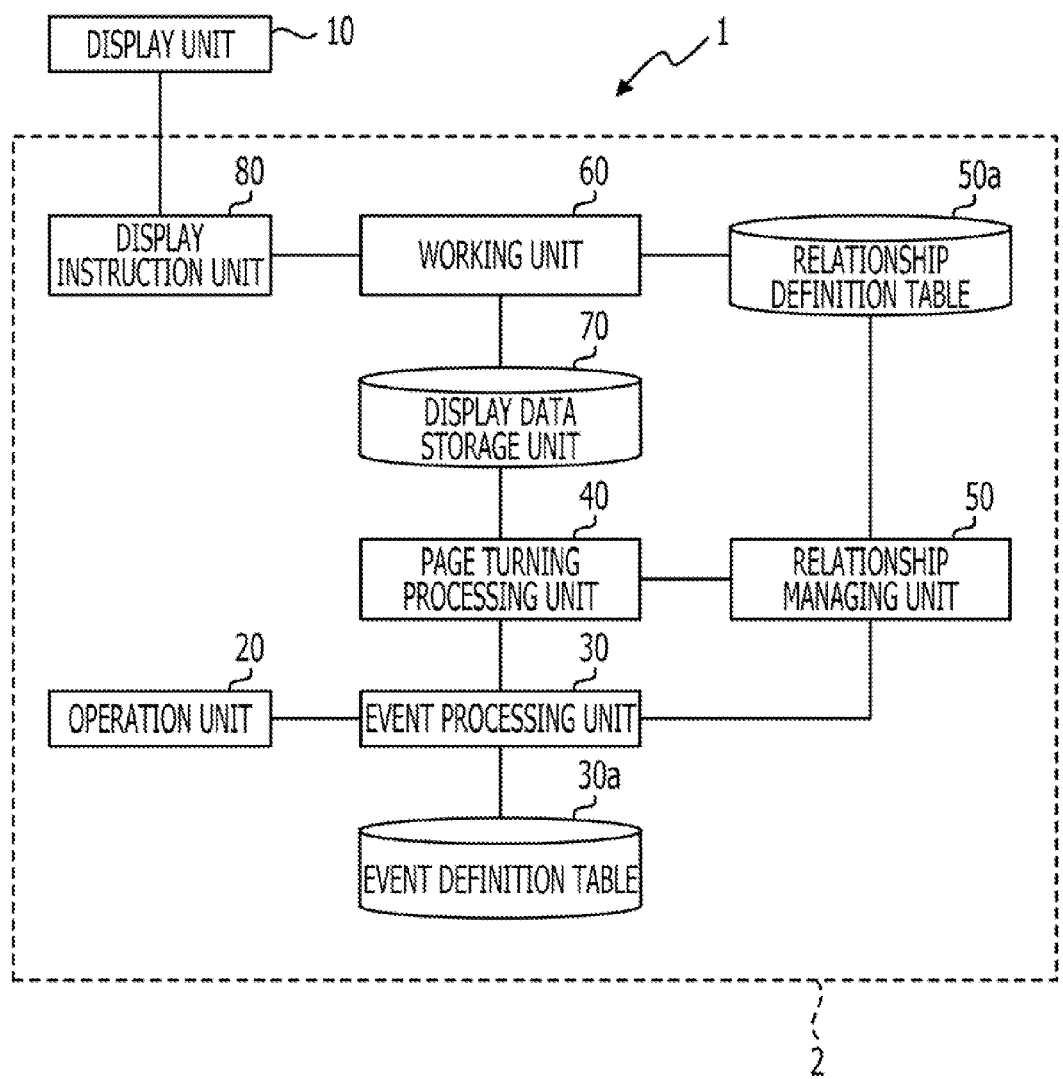
FIG. 2 is an example of functional block diagram of the display device.

FIG. 2 is a block diagram illustrating functional blocks of the display device. The display device 1 of the embodiment has a display unit 10, an operation unit 20, an event processing unit 30, an event definition table 30a, a page turning processing unit 40, a relationship managing unit 50, a relationship definition table 50a, a working unit 60, a display data storage unit 70 and a display instruction unit 80.

The operation unit 20, the event processing unit 30, the event definition table 30a, the page turning processing unit 40, the relationship managing unit 50, the relationship definition table 50a, the working unit 60, the display data storage unit 70 and the display instruction unit 80 work as a display controller device 2 for implementing the display method of the filed application. The display controller device 2 displays an image on the display unit 10 by controlling each of the processing units described above in accordance with a control program stored in advance.

The display unit 10 is a display device and has the windows 11-14 as display areas. As an example of the display device, the display instruction unit 80 outputs display data of an amount corresponding to the number of windows delivered by the working unit 60 onto the respective windows 11-14 of the display unit 10.

The operation unit 20 is, e.g., a touch panel, a software button, a hardware button, a trackball, a trackpad, etc. The operation unit 20 accepts operation events of user's operations such as a page turning operation or various kinds of choosing operations. Upon accepting a user's operation event, the operation unit 20 notifies the event processing unit 30 of an event window number indicating a window on which the operation has occurred and an event number indicating a kind of the event.

Upon receiving the event window number and the event number from the operation unit 20, the event processing unit 30 carries out a process or requests a corresponding processing unit to carry out the process on the basis of the received event window number and the received event number. If the operation event indicated by the received event window number and the received event number is an event which relates to a page turning operation, the event processing unit 30 notifies the page turning processing unit 40 of the received event window number and the received event number.

The page turning processing unit 40 carries out three processes which are a data initializing process, a previous page turning process and a next page turning process. The page turning processing unit 40 refers to and modifies display original data stored in the display data storage unit 70 in order to implement these processes. The display original data mentioned herewith is display data extracted page by page from a document to be displayed on the windows 11-14 of the display unit 10. The document to be displayed can be of any file format as long as it is an electronic document formed by a plurality of pages. Further, the document to be displayed can be one held in the display device 1 in advance, or can be one obtained from a device connected to a communication network if the display device 1 has a communication mechanism.

Figure 3:
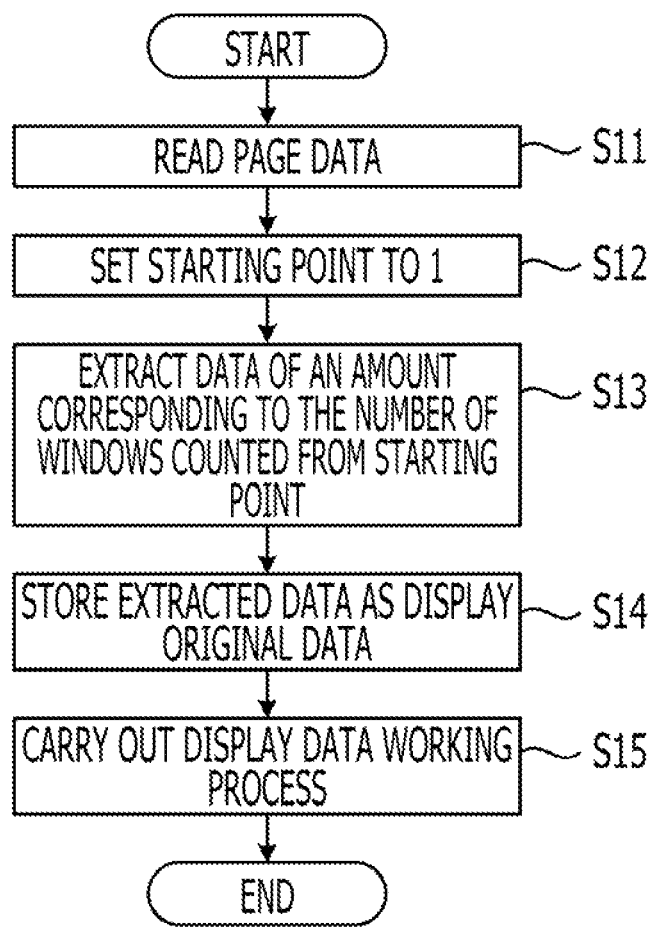
FIG. 3 is a flowchart illustrating a procedure of a data initializing process carried out by a page turning processing unit.

The processes carried out by the page turning processing unit 40 will be explained hereafter. FIG. 3 is a flowchart illustrating a procedure of the data initializing process carried out by the page turning processing unit 40. The page turning processing unit 40 reads page data of a queue or linear list format at first (operation S11), and sets a starting point to an initial value 1 (operation S12). The page turning processing unit 40 extracts data of an amount corresponding to the number of windows counted from the starting point from the page data (operation S13), and stores the extracted data in the display data storage unit 70 as the display original data (operation S14). The page turning processing unit 40 transmits the display original data to the working unit 60 so as to make the working unit 60 carry out a display data working process (operation S15).

The display data working process carried out by the working unit 60 will be described later in detail.

Figure 4:
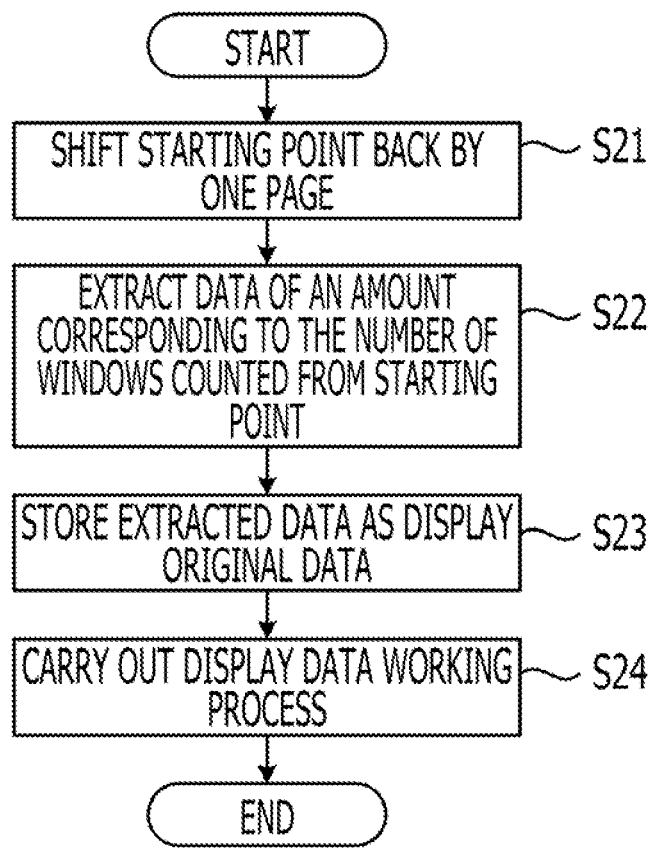
FIG. 4 is a flowchart illustrating a procedure of a previous page turning process carried out by the page turning processing unit.

FIG. 4 is a flowchart illustrating a procedure of the previous page turning process carried out by the page turning processing unit 40. According to the previous page turning process, the page turning processing unit 40 shifts the starting point back (reduce) by one page (operation S21), extracts data of an amount corresponding to the number of windows counted from the starting point from the page data (operation S22) and stores the extracted data in the display data storage unit 70 as the display original data (operation S23). The page turning processing unit 40 transmits the stored display original data to the working unit 60 so as to make the working unit 60 carry out the display data working process (operation S24).

Figure 5:
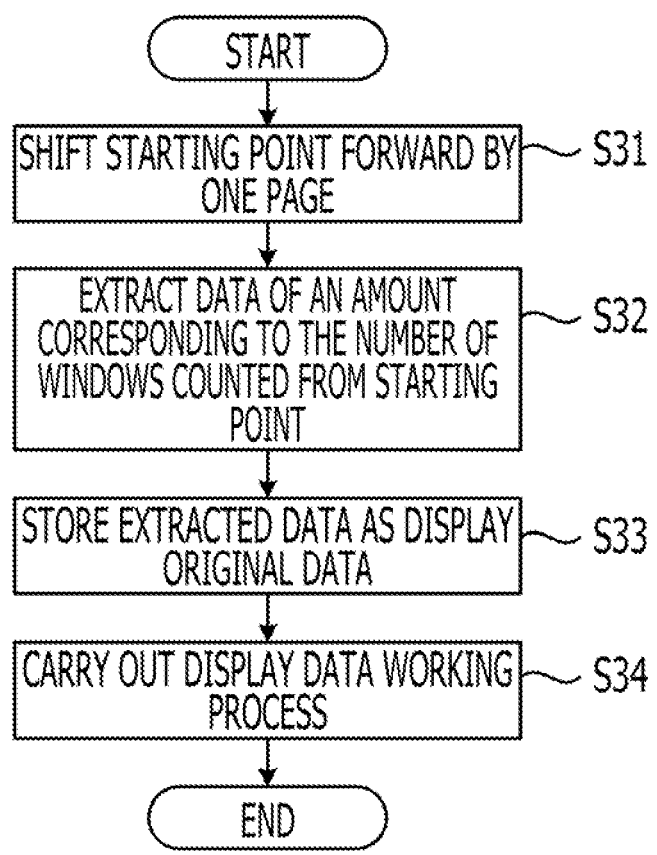
FIG. 5 is a flowchart illustrating a procedure of a next page turning process carried out by the page turning processing unit.

FIG. 5 is a flowchart illustrating a procedure of the next page turning process carried out by the page turning processing unit 40. According to the next page turning process, the page turning processing unit 40 shifts the starting point forward (add) by one page (operation S31), extracts data of an amount corresponding to the number of windows from the page data (operation S32) and stores the extracted data in the display data storage unit 70 as the display original data (operation S33). The page turning processing unit 40 transmits the stored display original data to the working unit 60 so as to make the working unit 60 carry out the display data working process (operation S34).

A process carried out by the relationship managing unit 50 will be explained. The relationship managing unit 50 specifies relationships between the display original data stored in the display data storage unit 70 and the windows 11-14 onto which the display original data is output, and a process type applied to the display original data, on the basis of contents described in the relationship definition table 50a.

FIGS. 6A and 6B are diagrams which illustrate an example of the relationship definition table 50a. The relationship definition table 50a is a set of three parameters which are an output window number, a processing function name and an input original data number. The output window number mentioned herewith is a number for distinguishing the windows 11-14 provided to the display unit 10. The processing function name is a name of a process or a function to be applied to the display original data. The input original data number is a number for specifying the display original data. FIG. 6A illustrates, e.g., a state in which no processing function has been defined. That is, symbols "NA" recorded in columns of the processing function name and the input original data number indicate that neither of the processing function and the display original data has been defined yet. FIG. 6B illustrates an example in which a processing function name and an input original data number have been defined in the window of the output window number 2 (e.g., the window 12), and it is indicated that a result of applying a processing function specified as "square" to the first data of the display original data is displayed in the second window.

Figure 7:
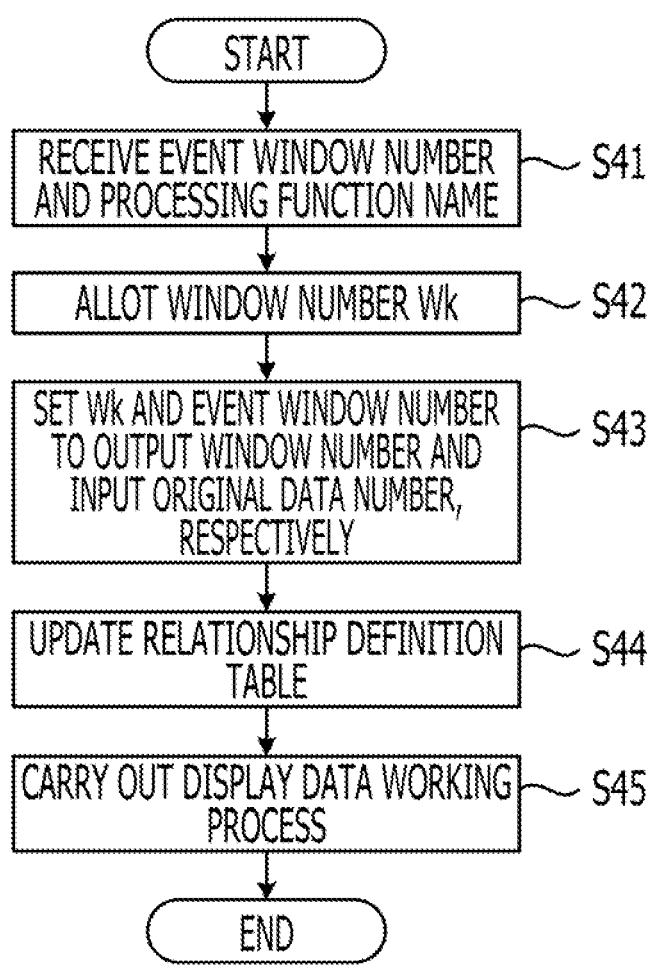
FIG. 7 is a flowchart illustrating a procedure of a relationship application process carried out by a relationship managing unit.

FIG. 7 is a flowchart illustrating a procedure of a relationship application process carried out by the relationship managing unit 50. Upon receiving an event window number and a processing function name from the event processing unit 30 (operation S41), the relationship managing unit 50 allots a window number Wk for which a corresponding result of processing can be displayed (operation S42). The relationship managing unit 50 allots the window number by referring to the relationship definition table 50a. A process carried out by the event processing unit 30 will be described later in detail.

The allotting operation is done as follows. Let the event window number and the number of windows be Wm and N, respectively, and search for the lowest Wk being an output window number of the relationship definition table 50a for which no processing function name has been defined in the range of Wm<Wk<=N. If such Wk exists, allot that Wk as a display enabling window number.

If no such Wk exists, search further for the highest Wk being an output window number of the relationship definition table 50a for which no processing function name has been defined in the range of 1<=Wk<Wm. If such Wk exists, allot that Wk as a display enabling window number. If no such Wk exists, let Wm itself be Wk and allot that as a display enabling window number.

The allotting method described above is just an example, and another way of implementation can be available. Provide each of the windows 11-14 of the display unit 10 with a position data sensor, e.g., so that a window of a physically closest position for which no processing function name has been defined can be allotted.

The relationship managing unit 50 sets Wk and the event window number to the output window number and the input original data number, respectively (operation S43), and updates the processing function name and the input original data number corresponding to the relevant output window number of the relationship definition table 50a (operation S44). Then, the relationship managing unit 50 makes the working unit 60 carry out the display data working process (operation S45).

Figure 8:
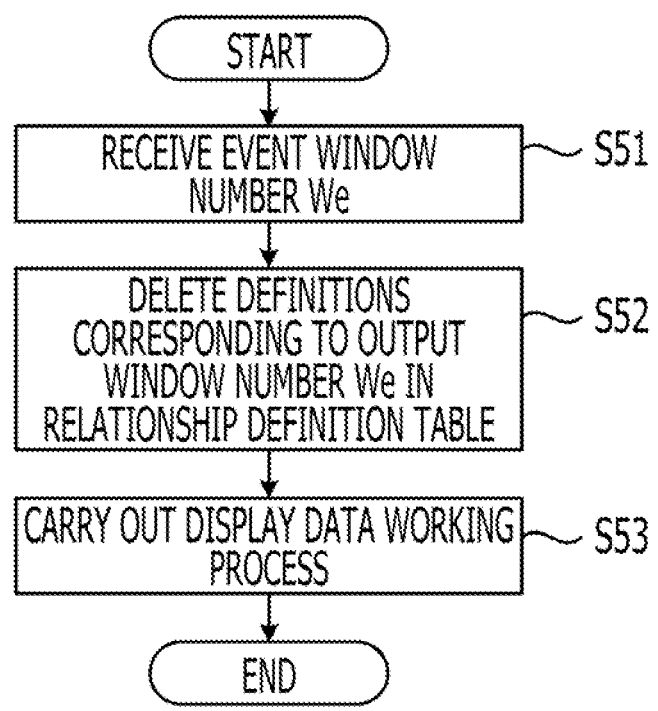
FIG. 8 is a flowchart illustrating a procedure of a relationship restoring process carried out by the relationship managing unit.

FIG. 8 is a flowchart illustrating a procedure of a relationship restoring process carried out by the relationship managing unit 50. Upon receiving an event window number We from the event processing unit 30 (operation S51), the relationship managing unit 50 deletes definitions of the processing function name and the input original data number of a row for which the output window number agrees with the event window number We in the relationship definition table 50a (operation S52), so as to return them to an undefined state. Then, the relationship managing unit 50 makes the working unit 60 carry out the display data working process (operation S53).

Figure 9:
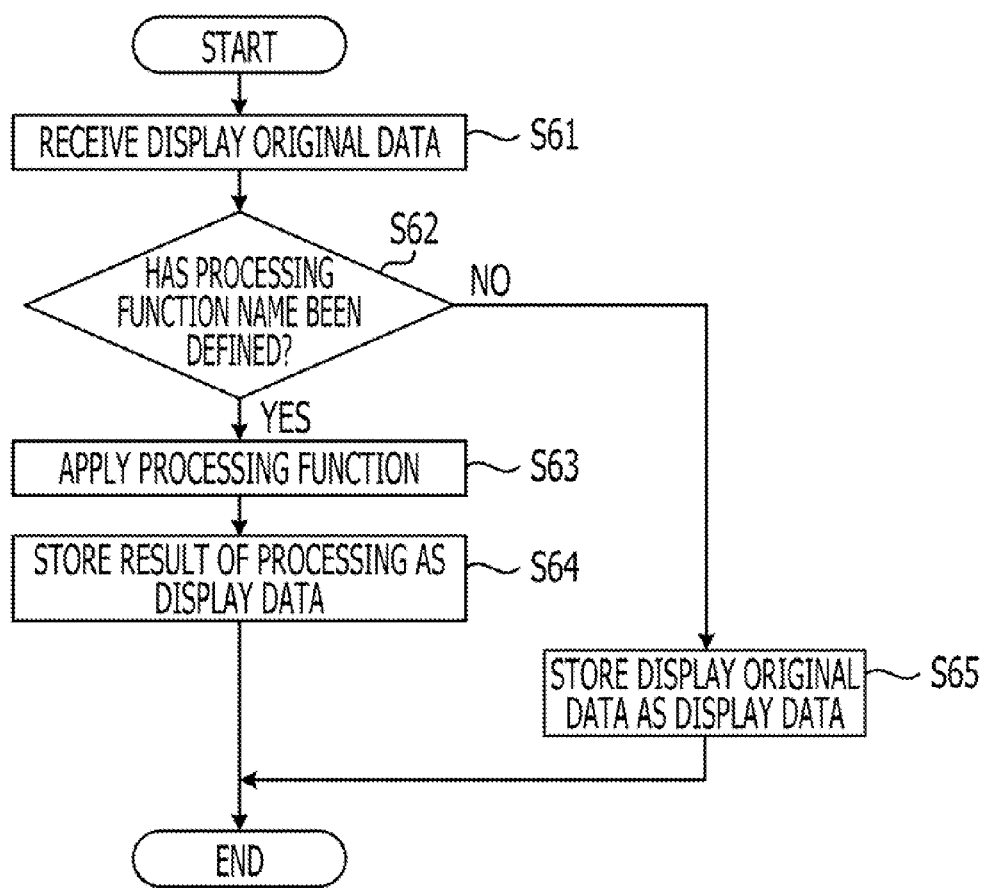
FIG. 9 is a flowchart illustrating a procedure of a display data working process carried out by a working unit.

The display data working process carried out by the working unit 60 will be explained. FIG. 9 is a flowchart illustrating a procedure of the display data working process carried out by the working unit 60. Upon receiving the display original data (operation S61), the working unit 60 identifies for every output window number Wi (Wi=1, 2, 3, 4) whether a processing function name has been defined (operation S62). If a processing function name has been defined (S62: YES), the working unit 60 applies the processing function to data corresponding to an input original data number Xk of the display original data (operation S63), and stores a result of processing in the display data storage unit 70 as Wi-th display data corresponding to the relevant output window number (operation S64). If no processing function name has been defined (S62: NO), the working unit 60 stores Xi-th display original data corresponding to the relevant output window number Wi in the display data storage unit 70 as it is as the Wi-th display data (operation S65).

The display instruction unit 80 displays the display data stored in the display data storage unit 70 onto the respective windows 11-14 of the display unit 10 after the display data working process finishes.

Figure 10A:
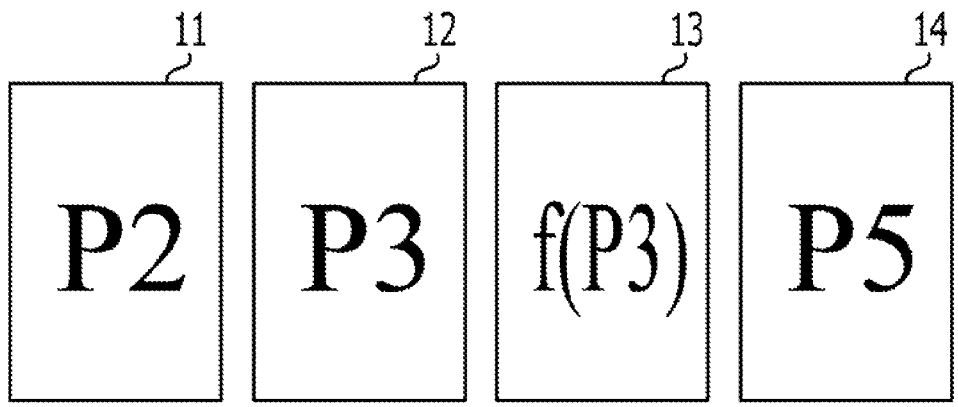
FIGS. 10A and 10B are diagrams illustrating an application example of the display data working process.
Figure 10B:
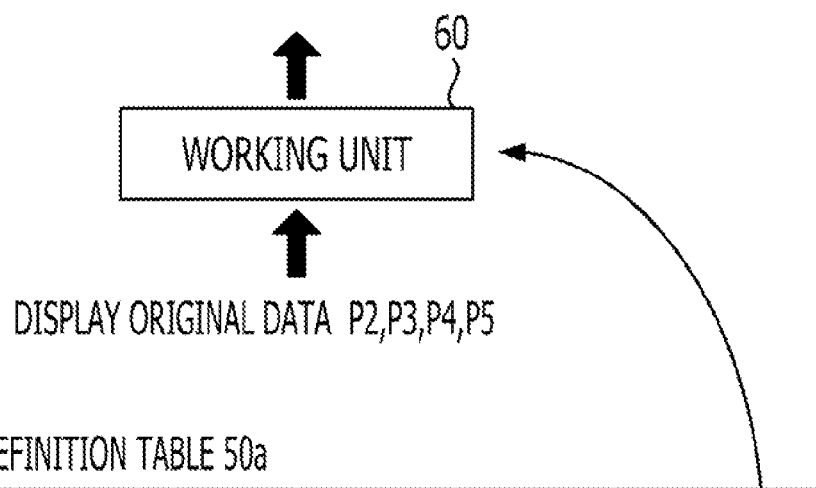

FIGS. 10A and 10B are diagrams illustrating an application example of the display data working process. FIG. 10B illustrates that a processing function "f" is defined in the window of the output window number 3 in the relationship definition table 50a, and that a result of applying the processing function specified by "f" to the second data of the display original data is displayed on the third window. If the display original data is data named P2, P3, P4 and P5, the working unit 60 produces display data corresponding to P2, P3, f(P3) and P5 as the display data as illustrated in FIG. 10B. The display original data is stored as it is in every first, second and fourth display data being undefined in the relationship definition table 50a. The result of applying the processing function "f" to the second display original data is stored in the third display data in accordance with the relationship definition table 50a. A state illustrated in FIG. 10A is consequently output onto the windows 11-14.

An operation of the event processing unit 30 will be explained. Assume that a relationship among the event number, the event name, the process type and the processing function name has been defined in the event definition table 30a that the event processing unit 30 refers to. FIG. 11 is a diagram illustrating an example of the event definition table 30a. The process type of the event number 1 is the next page turning process, e.g., and the relevant event name and processing function name are defined by a left flick and "left". That is, what is defined is to apply a processing function having a processing function name "left" so as to carry out a next page turning operation upon the operation unit 20 accepting a leftward flick operation in one of the windows 11-14. The process type defined by any of the other event numbers is similar to the above.

FIG. 12 is a flowchart illustrating a procedure of a process carried out by the event processing unit 30. Upon receiving an event window number and an event number for which a user's operation has occurred (operation S71), the event processing unit 30 searches for the relevant event number in the event definition table (operation S72).

If the process type is the next page turning process (operation S73: YES), the page turning processing unit 40 carries out the next page turning process (operation S74). If the process type is the previous page turning process (operation S75: YES), the page turning processing unit 40 carries out the previous page turning process (operation S76).

If the process type is the relationship restoring process (operation S77: YES), the relationship managing unit 50 carries out the relationship restoring process (operation S78). Otherwise (operation S77: NO), the relationship managing unit 50 carries out a relationship applying process (operation S79).

Figure 13A:
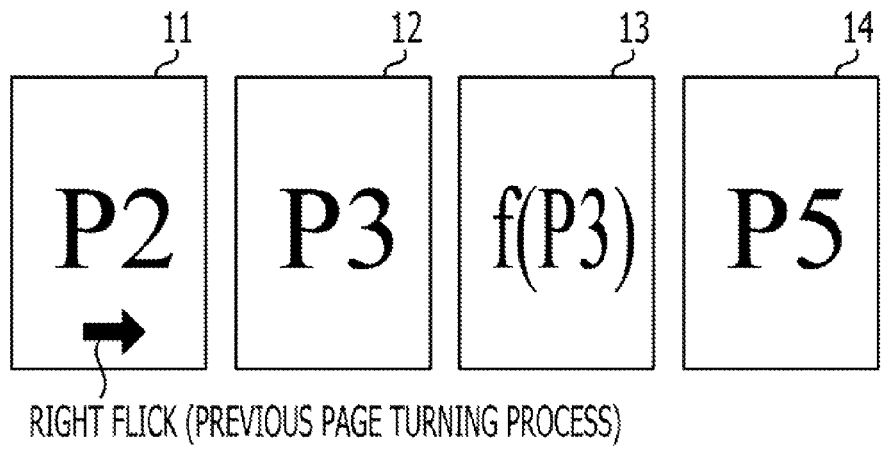
FIGS. 13A and 13B are diagrams illustrating an application example in case of a right flick operation.
Figure 13B:
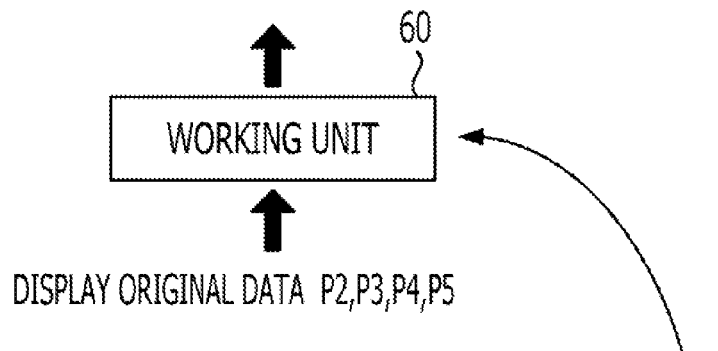
Figure 14A:
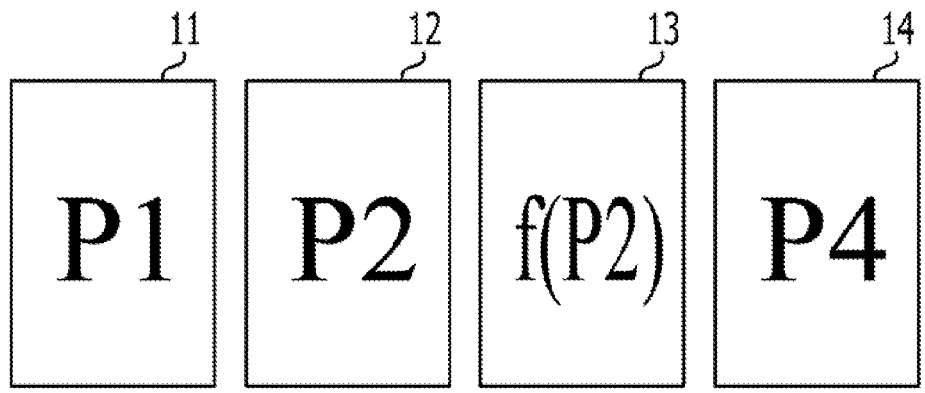
FIGS. 14A and 14B are diagrams illustrating an application example in case of a right flick operation.
Figure 14B:
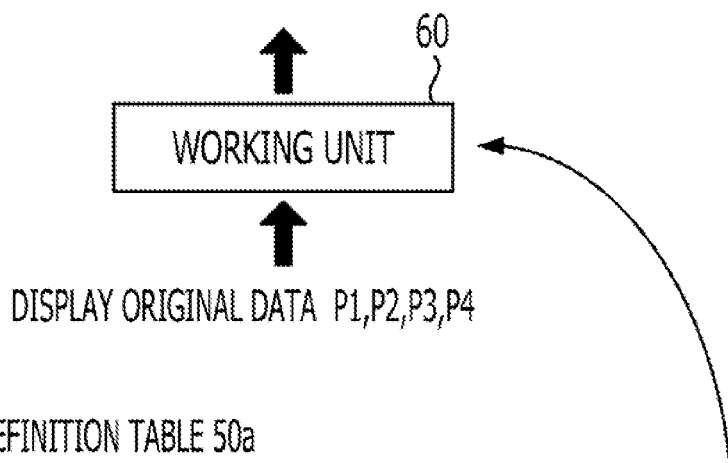

FIGS. 13A, 13B, 14A and 14B are diagrams illustrating an application example in case of a right flick operation. FIGS. 13A and 14A illustrate display examples on the four windows in a case where the relationship definition table 50a defines a relationship such that a result of applying the processing function "f" to the second display original data is output and displayed onto the third window as illustrated in FIGS. 13B and 14B. In a state illustrated in FIG. 13A, P3 can be compared with f(P3) between the adjacent windows. A right flick operation is done on the first window in this state, so that the previous page turning process is carried out as illustrated in FIGS. 14A and 14B. As the display data working process is carried out in accordance with the relationship definition table 50a illustrated in FIG. 14B, P2 can be compared with f(P2) between the adjacent windows as illustrated in FIG. 14A.

Repeated flick operations enable respective pages and results of processing to be successively displayed and compared with one another.

According to the embodiment, as data of a result of processing can be displayed close to a window on which original data is displayed, both of them can be easily compared with each other. Besides, as a pair of the original data and the result of processing is updated following a page turning operation, the original data can be successively compared with results of applying the process. Further, even if a new program for processing data is added to the system, a row can be added to the event definition table 30a that can thereby be updated. Thus, even if a certain page of data having a sequential structure is displayed on the first screen and a result of the new process is displayed on the second screen, a next page and a result of the new process for the next page can be displayed on the first and second screens, respectively, by the page turning operation.

Second Embodiment

The first embodiment results in a display such as P2, P3, f(P3) and P5, lacking the display of P4 between P3 and P5. The first embodiment employs a display format of the overlay mode which appears to the user that P4 is overlaid with f(P3). Meanwhile, a display such as P2, P3, f(P3) and P4 appears to the user that the result of processing f(P3) is inserted between P3 and P4, which is called an insert mode.

A form of a display in the insert mode will be explained as to a second embodiment. The functional structure of the display device 1 is substantially the same as that of the first embodiment. The working unit 60 works differently from the first embodiment.

Figure 15:
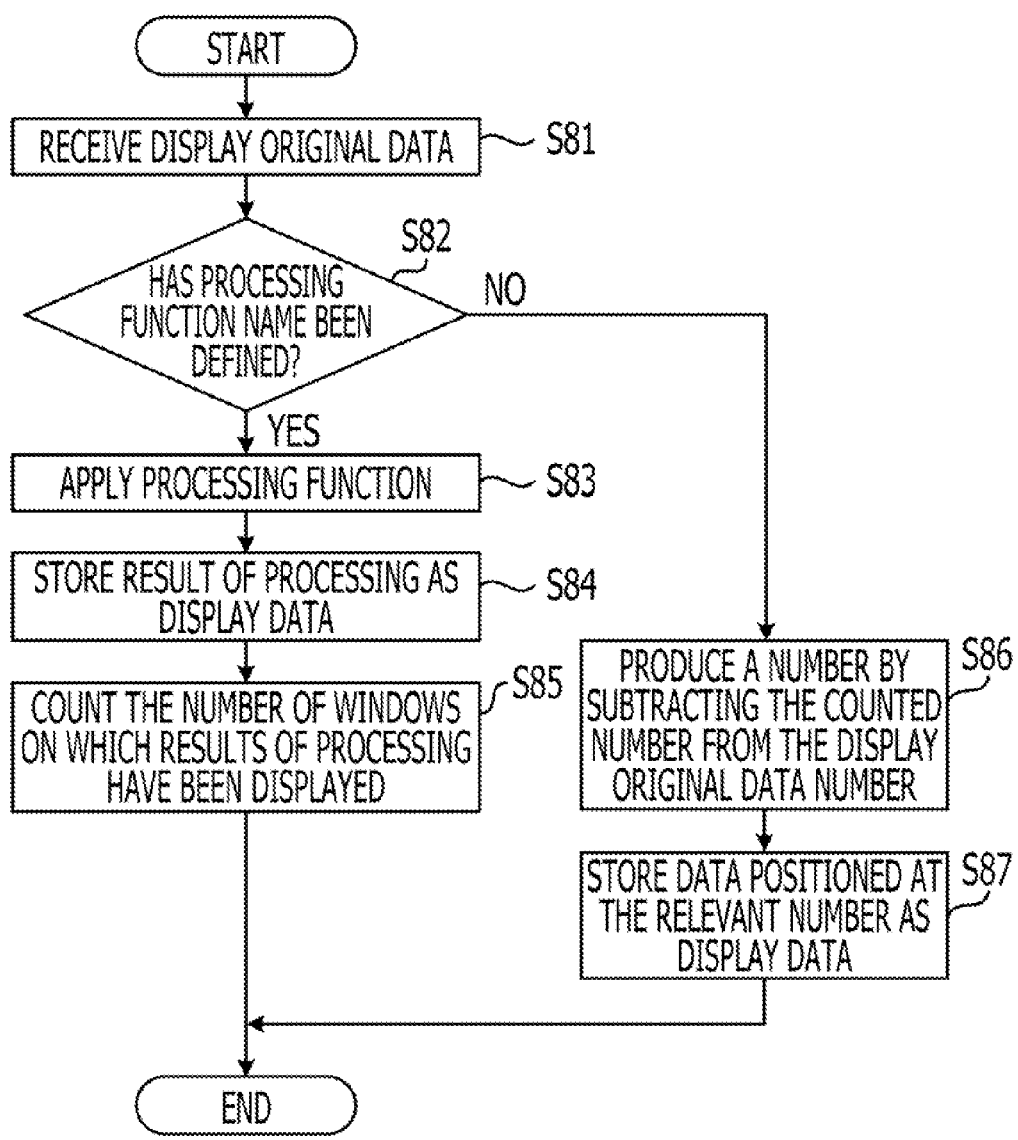
FIG. 15 is a flowchart illustrating a procedure of a display data working process of a second embodiment.

FIG. 15 is a flowchart of a procedure of a display data working process of the second embodiment. Upon receiving the display original data (operation S81), the working unit 60 identifies whether a processing function name has been defined for every output window number Wi (Wi=1, 2, 3, 4) in accordance with a procedure similar to that of the first embodiment (operation S82). If a processing function name corresponding to Wi has been defined (S82: YES), the working unit 60 applies the processing function to Xk-th data of the display original data specified by an input original data number Xk corresponding to Wi (operation S83), so as to store a result of processing in the display data storage unit 70 as Wi-th display data corresponding to a relevant output window number (operation S84).

The working unit 60 counts the number of windows on which results of processing have been displayed (operation S85). Upon identifying that no processing function name corresponding to Wi has been defined at the operation S82 (S82: NO), the working unit 60 produces a number by subtracting the number counted at the operation S85 from the display original data number (operation S86), and stores data of the display original data positioned at the relevant number in the display data storage unit 70 as Wi-th display data (operation S87). That is, if the number of windows on which results of processing have been displayed is m, (Wi-m)-th data of the display original data is stored as the Wi-th display data.

If an unprocessed window remains after the processes of the operations S85 and S87, carry out the processes following the operation S82.

Through these operations, consecutive pages except for the window on which the result of processing is being displayed can be displayed.

Third Embodiment

According to the first embodiment, the page turning process is carried out also in a case where a flick operation is done on a window on which a result of processing is being displayed. A flick operation of a third embodiment plays a changed role such as to end a process on a window on which the flick operation is done while a result of processing is being displayed and to display former display original data.

According to the third embodiment, the page turning processing unit 40 works differently from the first embodiment.

Figure 16:
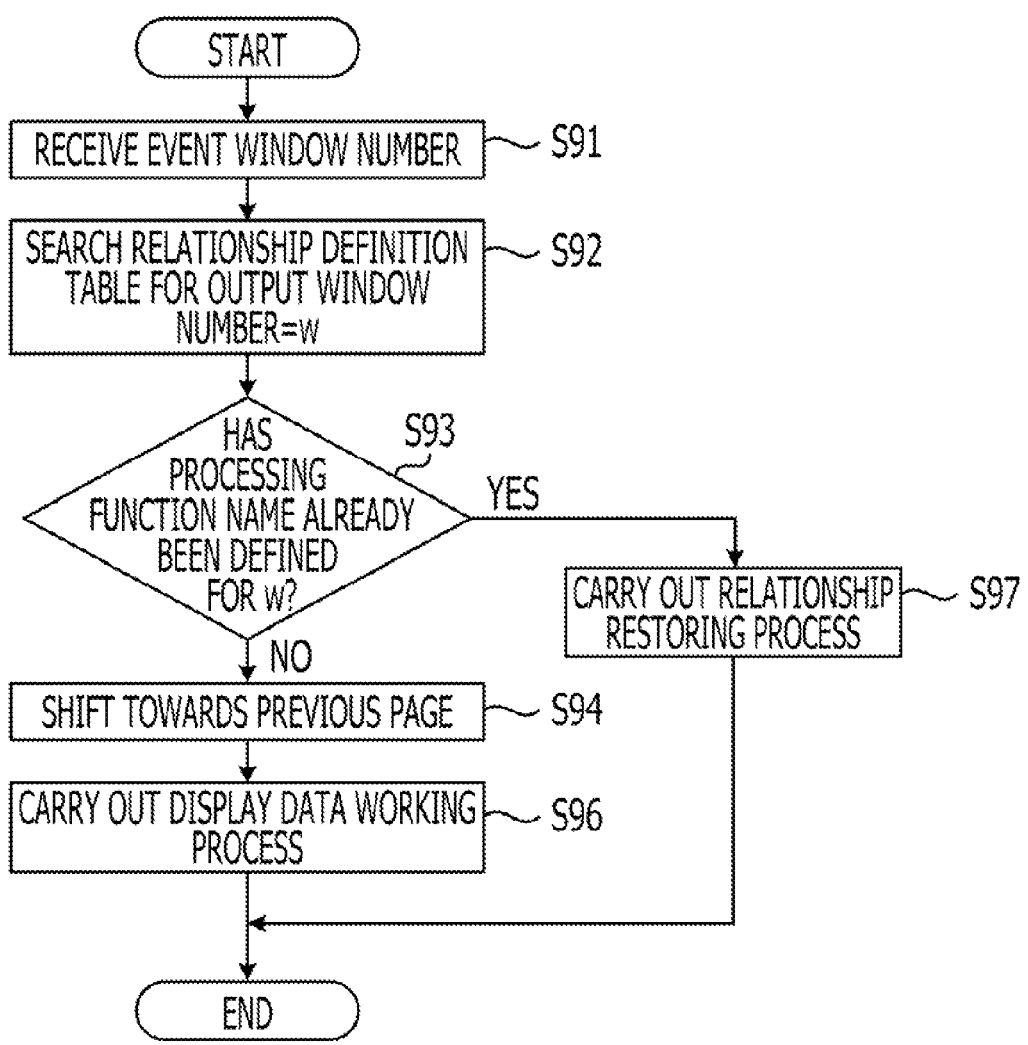
FIG. 16 is a flowchart illustrating a procedure of a previous page turning process of a third embodiment.

FIG. 16 is a flowchart illustrating a procedure of a previous page turning process of the third embodiment. The page turning processing unit 40 receives an event window number to which an event has occurred (numbered w) (operation S91) and searches for a row for which the output window number agrees with w in the relationship definition table 50a (operation S92), so as to identify whether a processing function name has already been defined (operation S93).

Unless a processing function name has already been defined (S93: NO), the display original data is shifted towards the previous page (operation S94), and the working unit 60 carries out the display data working process (operation S96). Meanwhile, if a processing function name has already been defined (S93: YES), make the relationship managing unit 50 carry out the relationship restoring process (operation S97).

Figure 17:
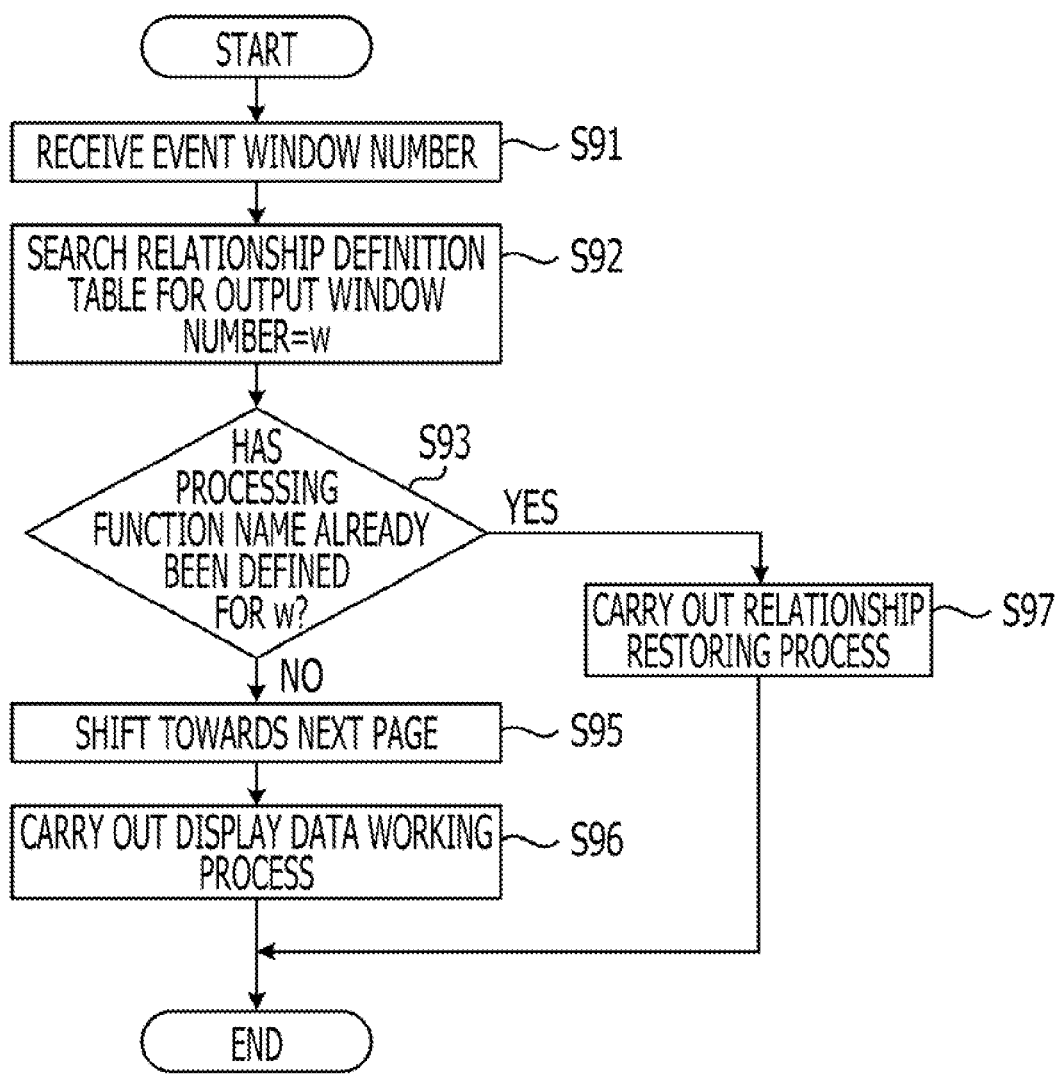
FIG. 17 is a flowchart illustrating a procedure of a next page turning process of the third embodiment.

FIG. 17 is a flowchart illustrating a procedure of a next page turning process of the third embodiment. The procedure of the next page turning process is substantially similar to that of the previous page turning process. That is, the page turning processing unit 40 receives an event window number to which an event has occurred (numbered w) (operation S91) and searches for a row for which the output window number agrees with w in the relationship definition table 50a (operation S92), so as to identify whether a processing function name has already been defined (operation S93).

Unless a processing function name has already been defined (S93: NO), the display original data is shifted towards the next page (operation S94), and the working unit 60 carries out the display data working process (operation S96). Meanwhile, if a processing function name has already been defined (S93: YES), make the relationship managing unit 50 carry out the relationship restoring process (operation S97).

According to the above procedure of processing, the process of the third embodiment can be finished by the flick operation.

Fourth Embodiment

According to the first embodiment, a result of the relationship application process is basically displayed on a window separate from a window on which an event has occurred, and the display changes owing to a page turning operation. There is, however, a process for which a result of processing is displayed on the window on which an event has occurred such as a clip process for fixing a certain page, and that process is not desired to be associated with the change of the display original data caused by the page turning operation. Such a process is called a self display mode.

The self display mode will be explained as to a fourth embodiment. According to the fourth embodiment, the operations of the relationship managing unit 50 and the working unit 60 of the first embodiment will be modified, so that a process for the self display mode can be implemented.

FIG. 18 is a diagram illustrating an example of an event definition table 30b to be used by the event processing unit 30 of the fourth embodiment. The event definition table 30b is a set of five parameters including the event number, the event name, the process type and the processing function name as well as the self display mode. A process having a self display mode being "F" is a processing function which displays a result of processing on another window. A process having a self display mode being "T" is a processing function which displays a result of processing on the self window.

Figure 19:
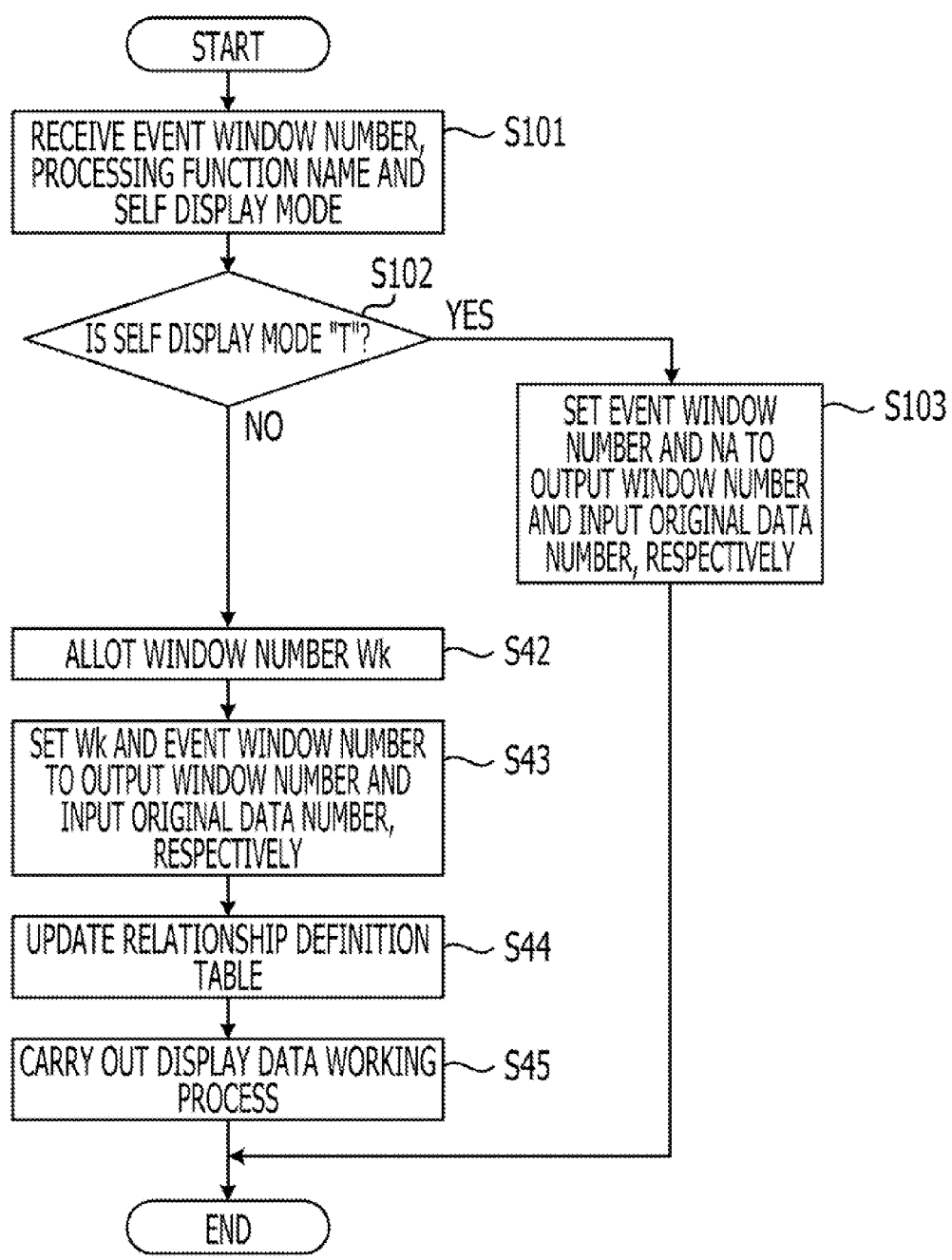
FIG. 19 is a flowchart illustrating a procedure of a relationship applying process of the fourth embodiment.

FIG. 19 is a flowchart illustrating a procedure of the relationship applying process of the fourth embodiment. The relationship managing unit 50 receives the self display mode in addition to the event window number and the processing function name from the event processing unit 30 (operation S101), and identifies whether the self display mode is "T" or not (operation S102).

Unless the self display mode is "T" (S102: NO), the relationship managing unit 50 carries out the process of the operation S42 through the operation S45 similarly as the first embodiment.

Meanwhile, if the self display mode is "T" (S102: YES), the relationship managing unit 50 sets the event window number to the output window number, and sets NA to the input original data number (operation S103).

Figure 20:
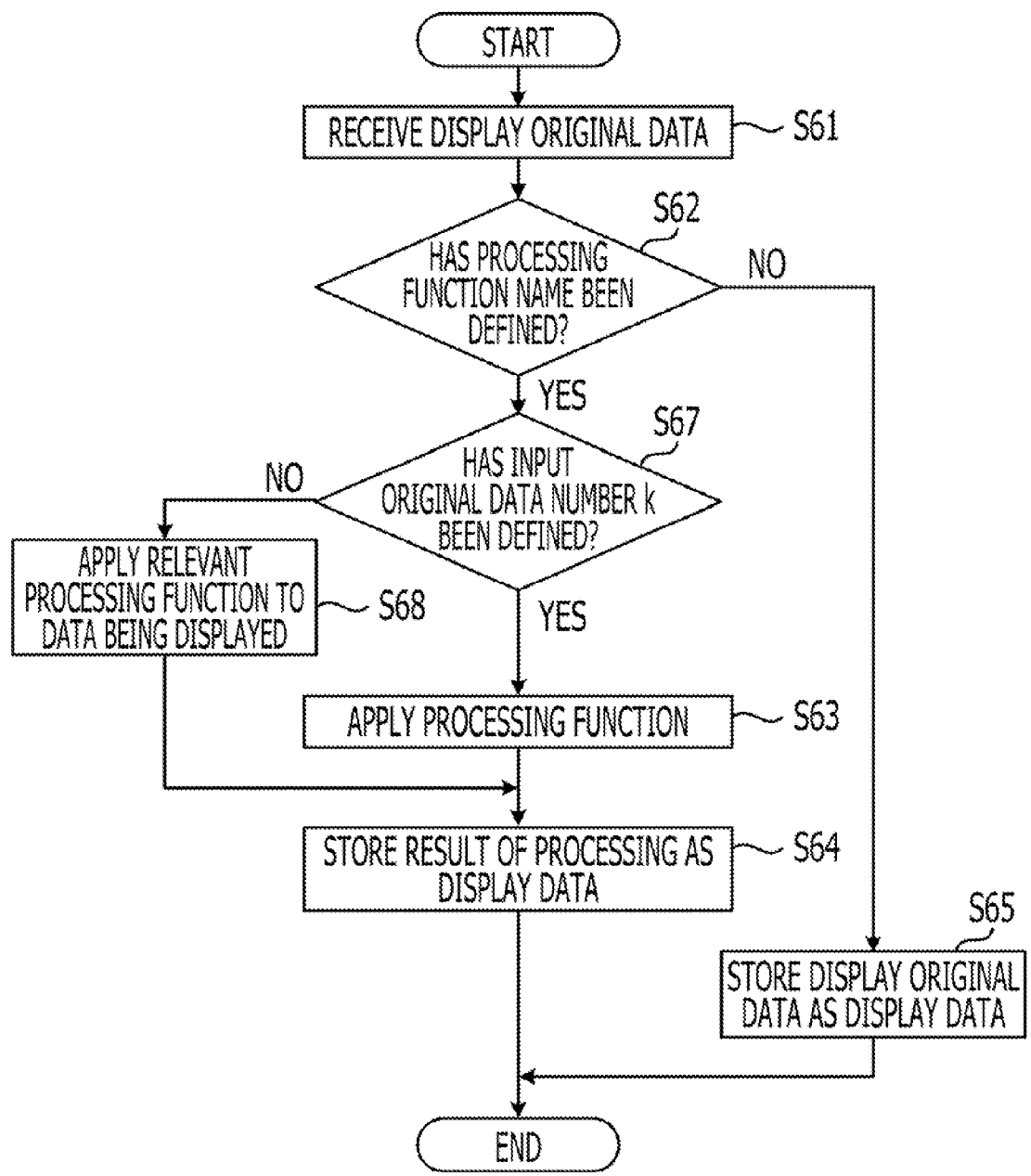
FIG. 20 is a flowchart illustrating a procedure of a display data working process of the fourth embodiment.

FIG. 20 is a flowchart illustrating a procedure of the display data working process of the fourth embodiment. Upon identifying that a processing function name has been defined in the relationship definition table 50a according to a procedure similar to that of the first embodiment (S62: YES), the working unit 60 identifies whether an input original data number k has been defined (operation S67). If the input original data number k has been defined (S67: YES), the working unit 60 carries out the process following the operation S63 similarly as the first embodiment.

Meanwhile, unless the input original data number k has been defined (S67: NO), the working unit 60 applies a processing function by the use of the display data being displayed on the present window as an argument (operation S68), and moves to the operation S64.

According to such a process of the fourth embodiment, a result of applying a processing function associated with a page turning operation and a result of applying a processing function of the self display mode being independent with the page turning operation can be mixed and displayed.

Although having the windows 11-14 as explained as to the first to fourth embodiments, the display device 1 need not have four windows but may be provided with two or more windows.

Although the display device 1 of the first to fourth embodiments is configured to have four windows 11-14, the display controller device 2 can implement the display method described above by controlling a plurality of display devices each having a single window.

Further, the computers of the above respective embodiments each have a CPU (Central Processing Unit), a ROM (Read Only Memory), a RAM (Random Access Memory)

and an input/output unit which are connected to one another as hardware devices. A program to be used by the CPU for control is recorded in the ROM. The CPU reads the program recorded in the ROM, and carries out a process according to the read program. Further, data used by the CPU for an operation is stored in the RAM and so is data of a result of the operation. The input/output unit accepts a user's operation input and provides the CPU with the operation input. Further, the input/output unit provides a network interface with an instruction signal outputted by the CPU. The network interface transmits the instruction signal outputted by the input/output unit to another computer via the network. The respective functional blocks in the display controller device 2 illustrated in FIG. 2 are implemented by processes of the CPU which runs software. Part or all of the processes can be implemented by hardware such as a logic circuit. A process of part of the program can further be left to an operating system (OS). Further, the respective storage units or tables in the display controller device 2 illustrated in FIG. 2 are implemented by a RAM or a storage area of a hard disk, etc. that the CPU can access.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

According to an aspect of the embodiments of the invention, any combinations of one or more of the described features, functions, operations, and/or benefits can be provided. A combination can be one or a plurality. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

What is claimed is:

1. A display controller device comprising:
    circuitry configured to
        cause a display to display first pieces of display data on a plurality of display areas of the display, the first pieces of display data being included in a plurality of display data each of which are associated with a display order, the plurality of display data including a first display data and a second display data which is associated with the first display data based on the display order, the first pieces of display data including the first display data displayed on a first display area among the plurality of display areas,
        cause the display to display a first processed display data that results from conducting a process function on the first display data on a second display area among the plurality of display areas,
        store information defining a relationship between the second display area and the process function that is to be applied to display data to be displayed on the first display area in accordance with the conducting of the process function on the first display data displayed on the second display area,
        cause, in response to receiving an input operation to update, the first pieces of display data to be updated, based on the display order, to second pieces of display data including the second display data, so that the first display data is updated to the second display data, each of the second pieces of display data being included in the plurality of display data,
        conduct the process function on the second display data by referring to the stored information, and
        cause, when the first pieces of display data are updated to the second pieces of display data based on the display order, the display to display the second display data of the second pieces of display data on the first display area and to display a second processed data that results from conducting the process function on the second display data on the second display area.

2. The display controller device of claim 1 further comprising:
    a memory configured to store an association between the second display area and the process function when the first processed display data is displayed on the second display area,
    wherein the circuitry is configured to,
        select the second pieces of display data from the plurality of display data based on the display order associated with the plurality of display data when an update of the first pieces of display data displayed on the plurality of display areas is requested,
        conduct the process function on the second display data to be displayed on the first display area based on the association of the display order with the plurality of display data and the display order, and
        cause the display to display the second display data on the first display area and to display the second processed data on the second display area in response to the request for updating.

3. The display controller device of claim 1, wherein the circuitry is configured to cause the display to display the first processed display data on the second display area in place of the second display data which has been displayed on the second display area when causing the display to display the first processed display data on the second display area.

4. The display controller device of claim 1, wherein the circuitry is configured to cause the display to display the second display data on a third display area in place of a third display data among the first pieces of display data which has been displayed on the third display area among the plurality of display areas when causing the display to display the first processed display data on the second display area on which the second display data has been displayed.

5. The display controller device of claim 1, wherein the circuitry is configured to cause the display to display the second pieces of data on the plurality of display areas in response to a request to update the plurality of display areas after the second processed display data is displayed on the second display area.

6. The display controller device of claim 1, wherein the first display area is adjacent to the second display area in the plurality of display areas.

7. The display controller device of claim 1, wherein the display order is page order of the plurality of display data.

8. The display controller device of claim 1, wherein the first pieces of display data are updated to second pieces of data by a page turning of the plurality of display data based on the page order.

9. The display controller device of claim 7, wherein the first pieces of display data are updated to second pieces of data by a page scroll of the plurality of display data based on the page order.

10. The display controller device of claim 9, wherein the page scroll is a page by page scroll.

11. The display controller device of claim 9, wherein the first pieces of display data are updated to second pieces of data by using one of a page turning button, a trackball, and flick operation.

12. The display controller device of claim 1, wherein the process function is a specific kind of process.

13. The display controller device of claim 1, wherein the process function is at least one of a process of providing the first display data with a comment and a process of converting a color of an image included in the first display data.

14. The display controller device of claim 1, wherein the process function is a process for extracting an outline of an image included in the first display data.

15. The display controller device of claim 1, wherein the process function is a process of translating a document included in the first display data.

16. The display controller device of claim 1, wherein the process function is a process of scoring a reply to a question included in the first display data.

17. A system comprising:
a display; and
a display control device including circuitry configured to:
cause a display to display first pieces of display data on a plurality of display areas, the first pieces of display data being included in a plurality of display data each of which are associated with a display order, the plurality of display data including a first display data and a second display data which is associated with the first display data based on the display order, the first pieces of display data including the first display data displayed on a first display area among the plurality of display areas,
cause the display to display a first processed display data that results from conducting a process function on the first display data on a second display area among the plurality of display areas,
store information defining a relationship between the second display area and the process function that is to be applied to display data to be displayed on the first display area in accordance with the conducting of the process function on the first display data displayed on the second display area,
cause, in response to receiving an input operation to update, the first pieces of display data to be updated, based on the display order, to second pieces of display data including the second display data, so that the first display data is updated to the second display data, each of the second pieces of display data being included in the plurality of display data,
conduct the process function on the second display data by referring to the stored information, and
cause, when the first pieces of display data are updated to the second pieces of display data based on the display order, the display to display the second display data of the second pieces of display data on the first display area and to display a second processed data that results from conducting the process function on the second display data on the second display area.

18. A method comprising:
causing a display to display first pieces of display data on a plurality of display areas, the first pieces of display data being included in a plurality of display data each of which are associated with a display order, the plurality of display data including a first display data and a second display data which is associated with the first display data based on the display order, the first pieces of display data including the first display data displayed on a first display area among the plurality of display areas;
causing the display to display a first processed display data that results from conducting a process function on the first display data on a second display area among the plurality of display areas;
storing information defining a relationship between the second display area and the process function that is to be applied to display data to be displayed on the first display area in accordance with the conducting of the process function on the first display data displayed on the second display area;
causing, in response to receiving an input operation to update, the first pieces of display data to be updated, based on the display order, to second pieces of display data including the second display data, so that the first display data is thereby updated to the second display data, each of the second pieces of display data being included in the plurality of display data;
conducting the process function on the second display data by referring to the stored information; and
causing, when the first pieces of display data are updated to the second pieces of display data based on the display order, the display to display the second display data of the second pieces of display data on the first display area and to display a second processed data that results from conducting the process function on the second display data on the second display area.

19. A non-transitory computer-readable medium having computer-readable instructions stored therein which when executed by a computer, causes the computer to perform a method, comprising:
causing a display to display first pieces of display data on a plurality of display areas, the first pieces of display data being included in a plurality of display data each of which are associated with a display order, the plurality of display data including a first display data and a second display data which is associated with the first display data based on the display order, the first pieces of display data including the first display data displayed on a first display area among the plurality of display areas;

causing the display to display a first processed display data that results from conducting a process function on the first display data on a second display area among the plurality of display areas;

storing information defining a relationship between the second display area and the process function that is to be applied to display data to be displayed on the first display area in accordance with the conducting of the process function on the first display data displayed on the second display area;

causing, in response to receiving an input operation to update, the first pieces of display data to be updated, based on the display order, to second pieces of display data including the second display data, so that the first display data is thereby updated to the second display data, each of the second pieces of display data being included in the plurality of display data;

conducting the process function on the second display data by referring to the stored information; and causing, when the first pieces of display data are updated to the second pieces of display data based on the display order, the display to display the second display data of the second pieces of display data on the first display area and to display a second processed data that results from conducting the process function on the second display data on the second display area.

20. The display controller device of claim 1, wherein the plurality of display areas includes at least three display areas.

21. The display controller device of claim 1, wherein an additional display data succeeding the second processed data in chronological order based on the display order is not displayed in the plurality of display areas after each piece of display data is updated.

* * * * *